US012790713B2

(12) United States Patent
Westergren et al.

(10) Patent No.: US 12,790,713 B2
(45) Date of Patent: Nov. 10, 2026

(54) ROTATING PLATING FIXTURE

(71) Applicant: Rockwell Collins, Inc., Cedar Rapids, IA (US)

(72) Inventors: David L. Westergren, Cedar Rapids, IA (US); Timothy J. Nance, Cedar Rapids, IA (US); Jonathan Koonce, North Liberty, IA (US); Haley M. Steffen, Cedar Rapids, IA (US); Cassie Rork, Cedar Rapids, IA (US); Casey J. Martin, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 669 days.

(21) Appl. No.: 18/219,987

(22) Filed: Jul. 10, 2023

(65) Prior Publication Data

US 2025/0019858 A1 Jan. 16, 2025

(51) Int. Cl.

| | |
|---|---|
| ***C25D 17/06*** | (2006.01) |
| ***C25D 5/02*** | (2006.01) |
| ***C25D 17/00*** | (2006.01) |
| ***F16H 1/14*** | (2006.01) |
| ***F16H 57/021*** | (2012.01) |
| ***F16H 57/032*** | (2012.01) |

(52) U.S. Cl.

CPC ............. *C25D 17/06* (2013.01); *C25D 5/022* (2013.01); *C25D 17/007* (2013.01); *F16H 1/14* (2013.01); *F16H 57/021* (2013.01); *F16H 57/032* (2013.01); *F16H 2708/08* (2013.01)

(58) Field of Classification Search

CPC .............................. C25D 17/06; C25D 17/001

See application file for complete search history.

(56) References Cited

U.S. PATENT DOCUMENTS

| | | | | |
|---|---|---|---|---|
| 3,827,962 | A | 8/1974 | Ahmad | |
| 3,849,277 | A | 11/1974 | Miyata et al. | |
| 4,201,635 | A | 5/1980 | Muller | |
| 4,683,813 | A * | 8/1987 | Schultz | A21B 5/03 99/372 |
| 6,582,578 | B1 * | 6/2003 | Dordi | H10P 72/0454 427/430.1 |
| 6,884,335 | B2 | 4/2005 | Webb et al. | |
| 7,473,328 | B2 | 1/2009 | Yamasaki et al. | |
| 8,389,374 | B1 | 3/2013 | Lower et al. | |
| 8,575,844 | B1 | 11/2013 | Landt et al. | |
| 8,599,956 | B1 | 12/2013 | Mitchell | |

(Continued)

OTHER PUBLICATIONS

One Monroe ("The Complete Guide to Pillow Block Bearings", Jun. 2023, referred to as Monroe) (Year: 2023).*
"Probe", Dictionary.com, 2026 (Year: 2026).*

*Primary Examiner* — Alexander W Keeling
(74) *Attorney, Agent, or Firm* — Suiter Swantz IP

(57) ABSTRACT

A rotating plating fixture changes an orientation of the substrate throughout a plating cycle. The plating fixture changes the orientation by precisely controlling a rotation speed and position of the substrate. A stepper motor changes the orientation in response to control signals from a controller. The plating fixture includes a stepper motor fixed to a hanger, a shaft coupled to the stepper motor, a pinion gear coupled to the shaft such that rotation of the shaft by the stepper motor causes rotation of the pinion gear, and a bevel gear meshing with the pinion gear.

15 Claims, 10 Drawing Sheets

(56) References Cited

U.S. PATENT DOCUMENTS

| | | | | |
|---|---|---|---|---|
| 9,177,907 | B1 | 11/2015 | Lower et al. | |
| 11,108,374 | B1 | 8/2021 | Lower et al. | |
| 11,236,436 | B2 | 2/2022 | Korneisel et al. | |
| 11,373,976 | B2 | 6/2022 | Lower et al. | |
| 11,535,950 | B2 | 12/2022 | Kao et al. | |
| 2005/0092600 | A1* | 5/2005 | Yoshioka ............ | H10P 72/0441 204/198 |
| 2006/0030157 | A1* | 2/2006 | Ivanov ................... | B82Y 30/00 438/692 |
| 2006/0086616 | A1* | 4/2006 | Kurashina ................ | C25D 5/22 257/E21.585 |
| 2006/0199381 | A1 | 9/2006 | Chen et al. | |
| 2007/0141818 | A1 | 6/2007 | Basol | |
| 2015/0068890 | A1* | 3/2015 | Yoshioka ............... | C25D 17/06 204/297.01 |
| 2015/0218726 | A1* | 8/2015 | Feng ...................... | C25D 17/06 204/297.14 |
| 2016/0047058 | A1 | 2/2016 | Ahmed et al. | |
| 2016/0115617 | A1 | 4/2016 | Arvin et al. | |
| 2016/0215408 | A1* | 7/2016 | Kagajwala ............. | C25D 17/10 |

* cited by examiner

100

300

ROTATING PLATING FIXTURE

TECHNICAL FIELD

The present invention generally relates to electroplating, and more specifically to electroplating with moving electrodes.

BACKGROUND

In order to fill deep cavities with electroformed structures, long plating times are required. With the deep cavities, turbulent flow across the part can have an adverse effect on plating height variation which is exacerbated with plating time. A level deposit is critical for efficient plating as well as further processing. Therefore, it would be advantageous to provide a device, system, and method that addresses the shortcomings described above.

SUMMARY

A plating fixture comprises a hanger. The plating fixture comprises a stepper motor fixed to the hanger. The plating fixture comprises a shaft coupled to the stepper motor. The stepper motor is configured to rotate the shaft. The plating fixture comprises one or more pillow block bearings fixed to the hanger. The one or more pillow block bearings constrain the shaft to rotate relative to the one or more pillow block bearings. The plating fixture comprises a pinion gear coupled to the shaft such that rotation of the shaft by the stepper motor causes rotation of the pinion gear. The stepper motor, the shaft, and the pinion gear share a common axis of rotation. The plating fixture comprises a bevel gear coupled to and configured to rotate relative to the hanger. The bevel gear is disposed perpendicular to the pinion gear. The bevel gear meshes with the pinion gear.

The hanger comprises a horizontal portion. The stepper motor is fixed to the horizontal portion.

The hanger comprises the horizontal portion and a stem portion. The stem portion extends from the horizontal portion. The one or more pillow block bearings are fixed to stem portion.

The hanger comprises the horizontal portion, the stem portion, and a base portion. The base portion extends from the stem portion. The bevel gear is coupled to and configured to rotate relative to the base portion by a bushing.

The one or more pillow block bearings comprise at least two pillow block bearings.

The hanger, the shaft, the pinion gear, and the bevel gear comprise polyether ether ketone (PEEK).

The plating fixture comprises a plurality of probes coupled to and configured to rotate relative to the bevel gear. The plurality of probes and the bevel gear form a substrate holder.

The bevel gear comprises a face portion and a plurality of spacer portions. The plurality of spacer portions extend normal to the face portion. The plurality of probes and the plurality of spacer portions of the bevel gear form the substrate holder.

The plating fixture comprises a shield coupled to the bevel gear. The shield and the bevel gear form a substrate holder. The shield defines a plurality of holes.

The bevel gear comprises a face portion and a plurality of spacer portions. The plurality of spacer portions extend normal to the face portion. The shield and the plurality of spacer portions of the bevel gear form the substrate holder.

The plurality of holes are disposed in a polar array about an axis of rotation of the shield and the bevel gear.

A plating system comprises a plating bath holding a plating fluid. The plating system comprises a substrate. The plating system comprises an anode. The plating system comprises a rectifier. The rectifier is electrically coupled to the substrate and the anode. The plating system comprises a plating fixture. The plating fixture comprises a hanger. The plating fixture comprises a stepper motor fixed to the hanger. The plating fixture comprises a shaft coupled to the stepper motor. The stepper motor is configured to rotate the shaft. The plating fixture comprises one or more pillow block bearings fixed to the hanger. The one or more pillow block bearings constrain the shaft to rotate relative to the one or more pillow block bearings. The plating fixture comprises a pinion gear coupled to the shaft such that rotation of the shaft by the stepper motor causes rotation of the pinion gear. The stepper motor, the shaft, and the pinion gear share a common axis of rotation. The plating fixture comprises a bevel gear coupled to and configured to rotate relative to the hanger. The bevel gear is disposed perpendicular to the pinion gear. The bevel gear meshes with the pinion gear. The bevel gear, the anode and the substrate are disposed within the plating fluid. The stepper motor is disposed above the plating fluid. The plating system comprises a controller. The controller causes the stepper motor to rotate the bevel gear and the substrate.

The plating system comprises a plurality of probes coupled to and configured to rotate relative to the bevel gear. The plurality of probes and the bevel gear form a substrate holder for the substrate. The substrate is disposed between the plurality of probes and the bevel gear.

The plating fixture comprising a shield coupled to the bevel gear. The shield and the bevel gear form a substrate holder for the substrate. The shield defines a plurality of holes; wherein the substrate is disposed between the shield and the bevel gear.

The controller causes the stepper motor to rotate the bevel gear and the substrate in alternating directions between a clockwise direction and an anticlockwise direction.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
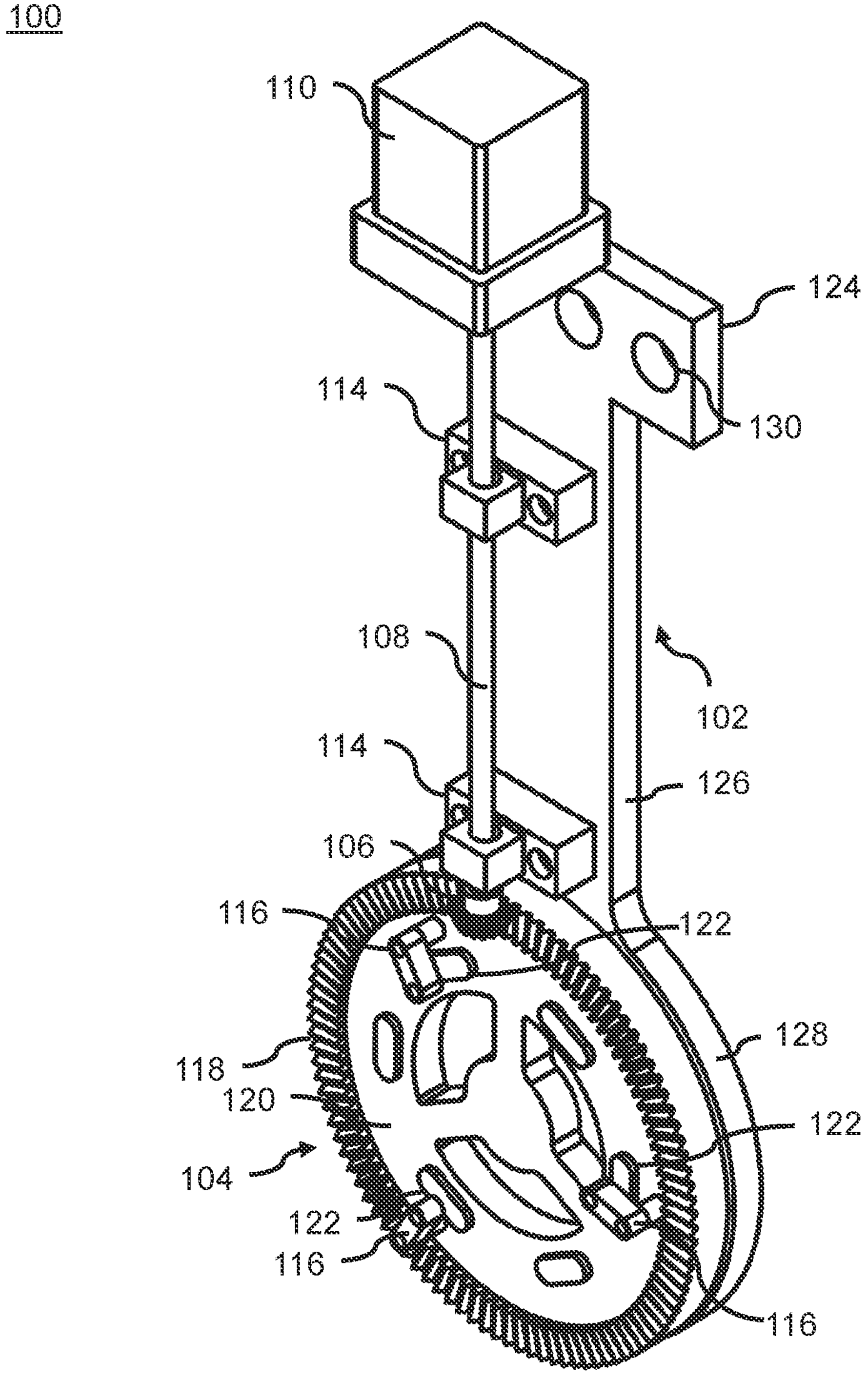
FIG. 1A depicts a perspective view of a plating fixture, in accordance with one or more embodiments of the present disclosure.
Figure 1B:
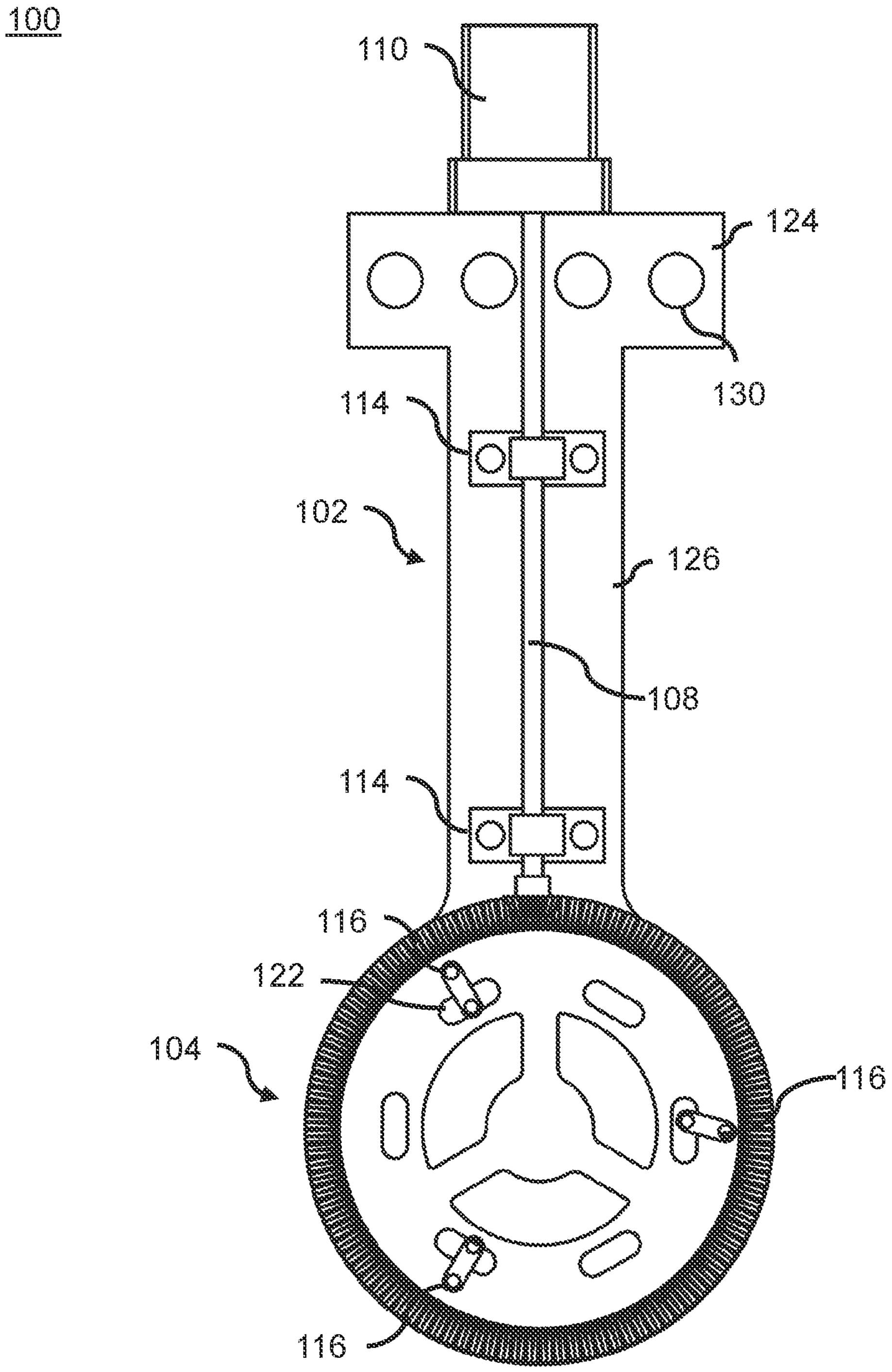
FIG. 1B depicts a front view of a plating fixture, in accordance with one or more embodiments of the present disclosure.
Figure 1C:
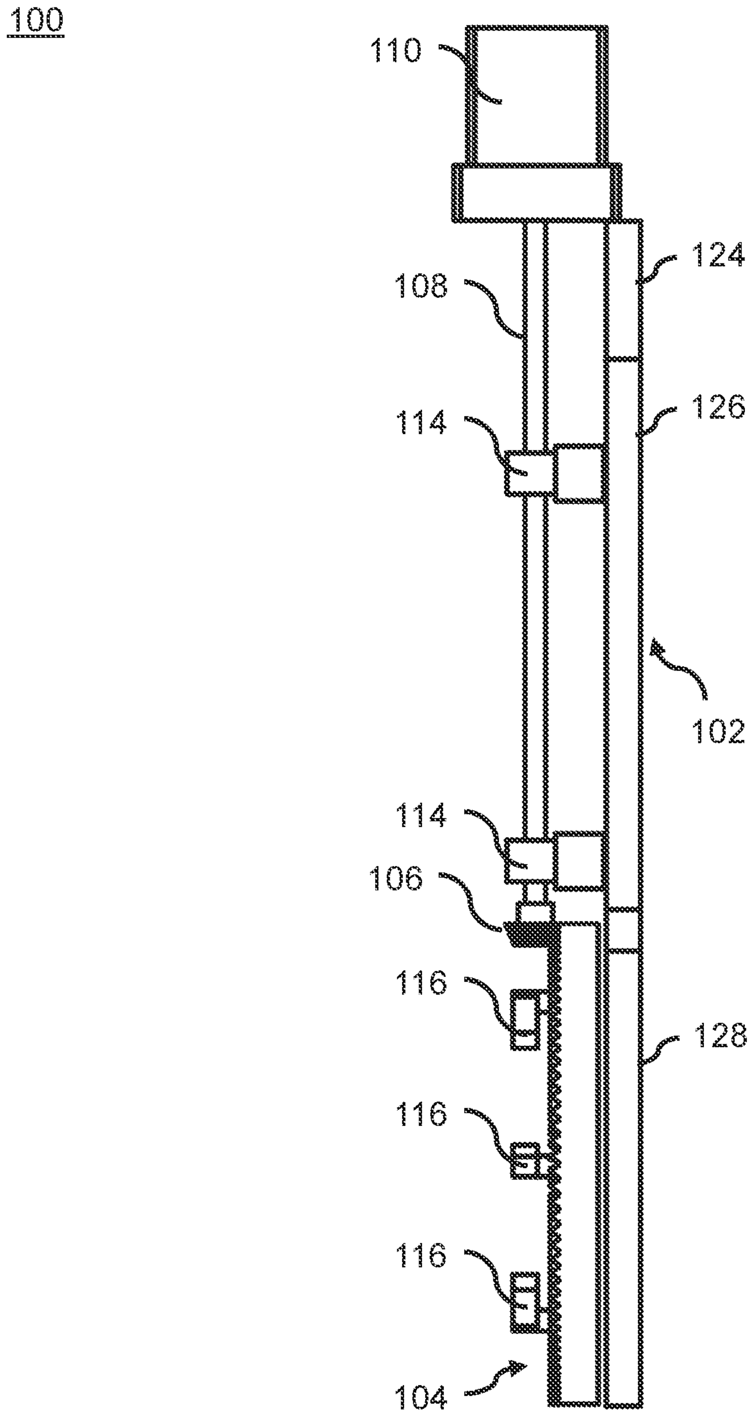
FIG. 1C depicts a side view of a plating fixture, in accordance with one or more embodiments of the present disclosure.
Figure 1D:
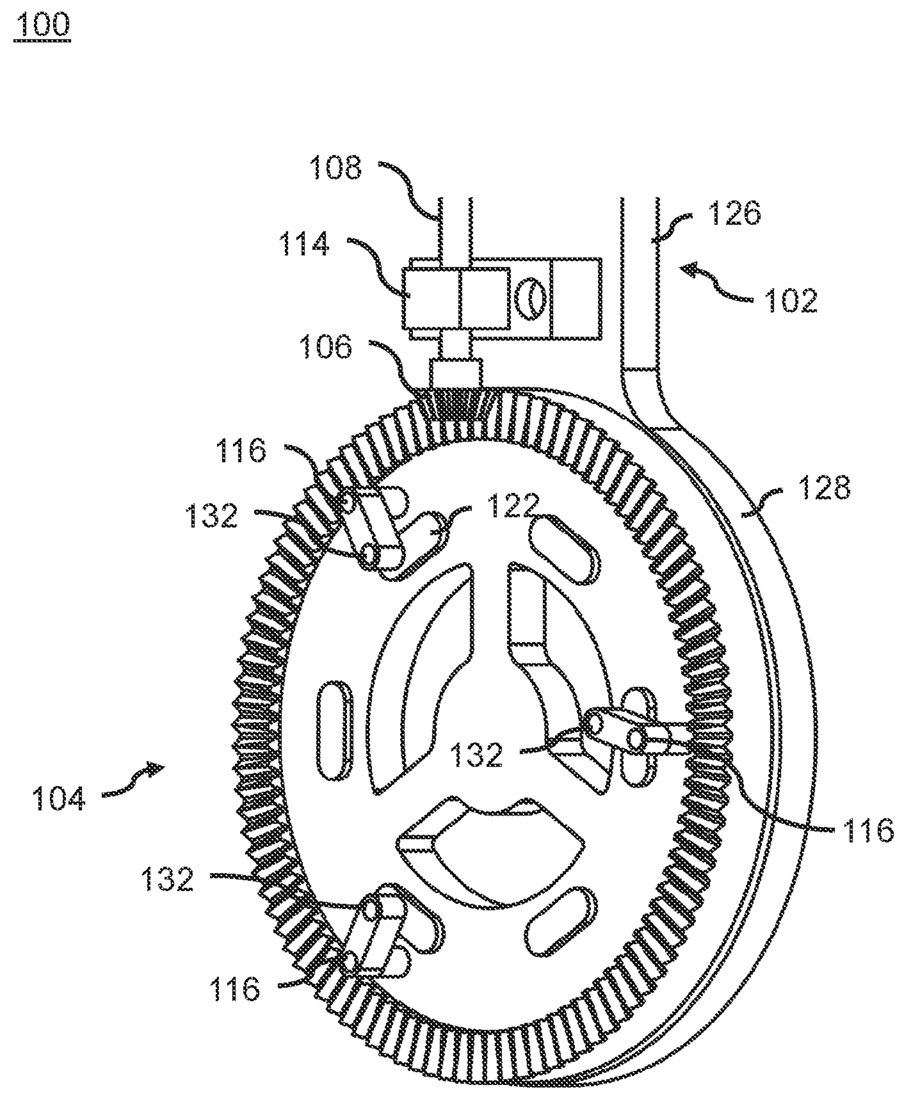
FIG. 1D depicts a perspective view of a substrate holder of a plating fixture in a first position, in accordance with one or more embodiments of the present disclosure.
Figure 1E:
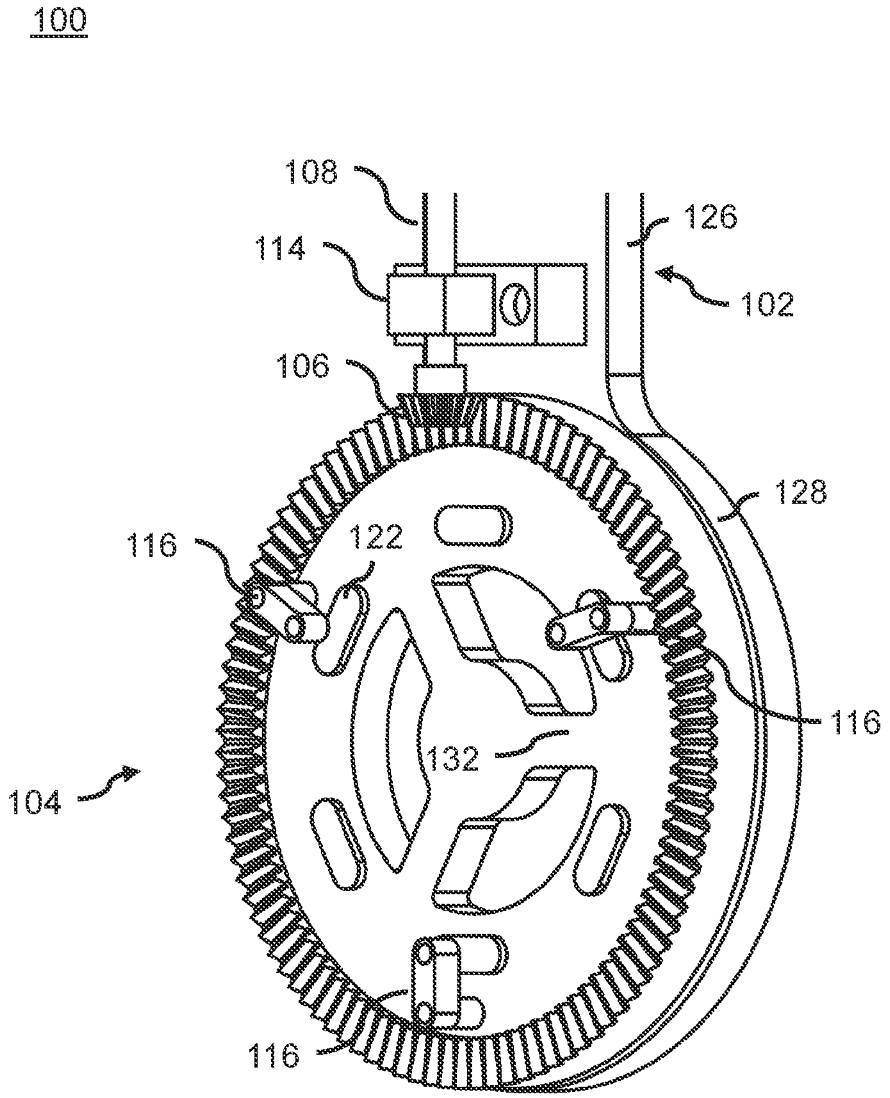
FIG. 1E depicts a perspective view of a substrate holder of a plating fixture in a second position, in accordance with one or more embodiments of the present disclosure.
Figure 1F:
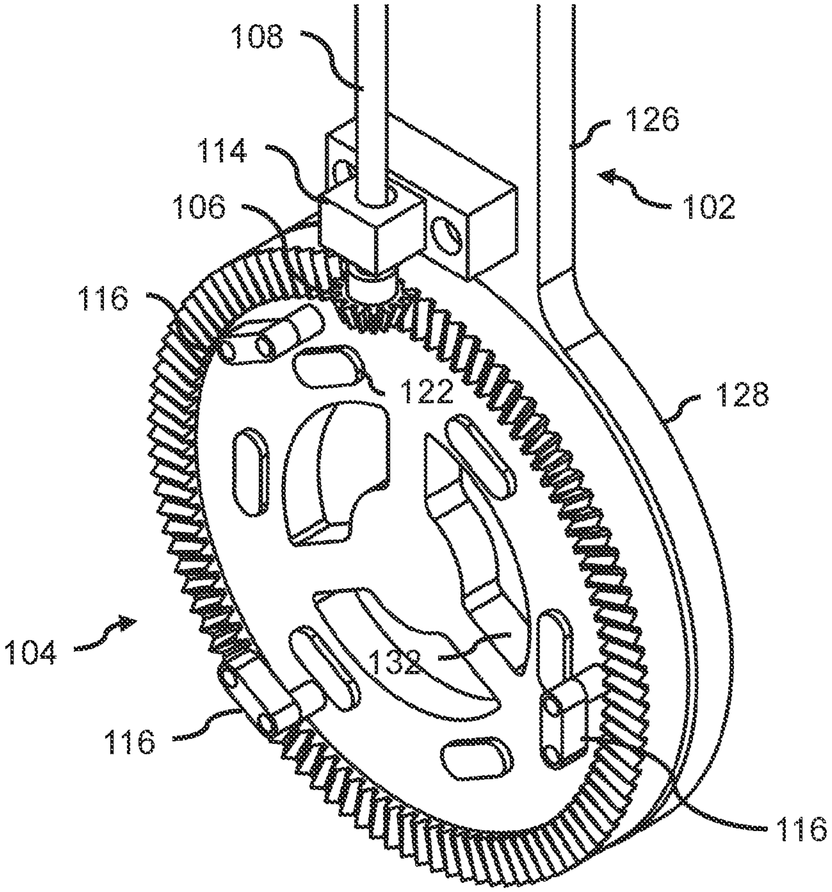
FIG. 1F depicts a perspective view of a substrate holder of a plating fixture including probes rotated relative to a bevel gear, in accordance with one or more embodiments of the present disclosure.
Figure 1G:
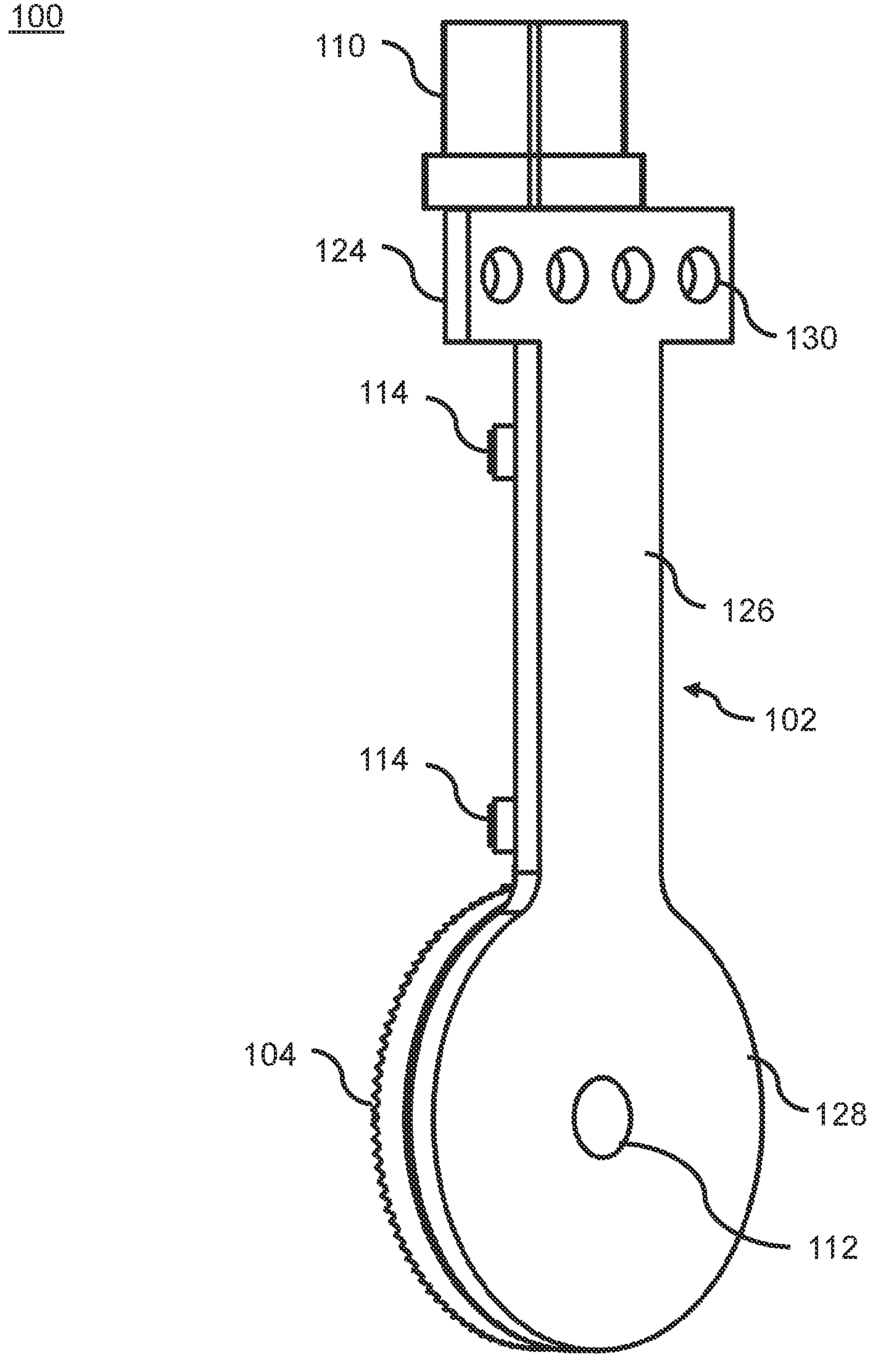
FIG. 1G depicts a rear view of a plating fixture, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a rotating plating fixture. The rotating plating fixture can change an orientation of a substrate throughout a plating cycle. The orientation of the substrate is changed precisely controlling the rotation speed and position of the substrate. The plating fixture includes a stepper motor to control the rotation. A controller controls the stepper motor. The plating fixture also includes gearing which is capable of very slow rotation as not to cause other plating issues.

U.S. Pat. Pub. No. 2006/0199381, titled "Electro-chemical deposition apparatus and method of preventing cavities in an ecd copper film"; U.S. Pat. No. 4,201,635, titled "Method and apparatus for carrying out an electrolysis process"; U.S. Pat. Pub. No. 2016/0115617, titled "Prevent and remove organics from reservoir wells"; U.S. Pat. No. 6,884,335, titled "Electroplating using DC current interruption and variable rotation rate"; U.S. Pat. No. 11,535,950, titled "Electro-plating and apparatus for performing the same"; U.S. Pat. Pub. No. 2016/0047058, titled "Metal plating system including gas bubble removal unit"; are each incorporated herein by reference in the entirety.

Referring now to FIG. 1, a plating fixture 100 is described, in accordance with one or more embodiments of the present disclosure. The plating fixture 100 may also be referred to as a rotating plating fixture. The plating fixture 100 is configured for use in an electroforming process, as will be described further herein. The plating fixture includes one or more components, such as, but not limited to, a hanger 102, bevel gear 104, pinion gear 106, shaft 108, stepper motor 110, bushing 112, one or more pillow block bearings 114, one or more probes 116, and the like.

The plating fixture 100 includes a hanger 102. The hanger 102 includes one or more portions, such as, but not limited to, a horizontal portion 124, a stem portion 126, and a base portion 128. The horizontal portion 124 defines one or more holes 130. The holes 130 are configured to receive one or more fasteners (not depicted) for securing the plating fixture 100 above a bath. The horizontal portion 124 may define any number of the holes 130. For example, the horizontal portion 124 is depicted as defining four of the holes 130, although this is not intended to be limiting. The stem portion 126 is joined to the horizontal portion 124. The stem portion 126 extends from the horizontal portion 124 to define a "T"-shape. The one or more pillow block bearings 114 are coupled to the hanger 102 via by the stem portion 126. The base portion 128 is joined to the stem portion 128. The stem portion 128 provides a protective barrier for a rear of the bevel gear 104. The base portion is coupled to the bushing 112.

The plating fixture 100 includes the stepper motor 110. In some embodiments, the stepper motor 110 is fixed to the hanger 102. The stepper motor 110 is fixed to the horizontal portion 124 of the hanger 102. For example, a housing of the stepper motor 110 may be fixed to the hanger 102. The stepper motor 110 is engaged in response to receiving a control signal. The stepper motor 110 is configured to rotate for a select number of steps. The number of steps or rotation is controlled based on the control signal. The control signal may be received from a motor controller or the like. The stepper motor 110 may include, but is not limited to, a DC stepper motor or the like.

The plating fixture 100 includes the shaft 108. The shaft 108 is coupled to the stepper motor 110. The stepper motor 110 is configured to rotate the shaft 108. The stepper motor 110 is configured to rotate the shaft 108 between a plurality of steps. The stepper motor 110 is configured to rotate the shaft 108 in both a clockwise and anticlockwise direction between the plurality of steps. The shaft 108 extends from the stepper motor 110 to the pinion gear 106.

The plating fixture 100 includes one or more pillow block bearings 114. The pillow block bearings 114 may also be referred to as plumber block bearings. The pillow block bearings 114 are fixed to the hanger 102. For example, the pillow block bearings 114 are fixed to the stem portion 126 of the hanger 102. The pillow block bearings 114 hold the shaft 108 and/or constrain the shaft 108 two-degrees of freedom. For example, the pillow block bearings 114 constrain the shaft 108 to rotate relative to the pillow block bearings 114 and translate linearly relative to the pillow block bearings 114. The pillow block bearings 114, in combination with the stepper motor 110 fixed to the hanger 102, constrains the shaft 108 to one-degree of freedom. For instance, the pillow block bearings 114, in combination with the stepper motor 110 fixed to the hanger 102, constrains the shaft 108 to rotate relative to the pillow block bearings 114.

The plating fixture 100 includes the pinion gear 106. The pinion gear 106 is coupled to the shaft 108. The shaft 108 transmits the power from the stepper motor 110 to the pinion gear 106. The pinion gear 106 experiences similar rotation as the shaft 108. The stepper motor 110 is configured to rotate the pinion gear 106 by rotating the shaft 108. The pinion gear 106, the shaft 108, and the stepper motor 110 share a common axis of rotation.

The plating fixture 100 includes the bevel gear 104. The bevel gear 104 may also be referred to as a crown gear, a face gear, or a contrate gear. The bevel gear 104 and the pinion gear 106 form a gear system. The bevel gear 104 meshes with the pinion gear 106. For example, one or more of the teeth 118 mesh with one or more teeth of the pinion gear 106. Rotation of the pinion gear 106 induces rotation of the bevel gear 104. In this regard, the stepper motor 110 is configured to rotate the bevel gear 104 via the shaft 108 and the pinion gear 106. The axis of rotation of the bevel gear 104 is 90-degrees from the axis of rotation of the stepper motor 110, the shaft 108, and the pinion gear 106. The meshing changes the rotatory motion by 90 degrees. In some embodiments, the pinion gear 106 is smaller than the bevel gear 104. It is contemplated that the bevel gear 104 and the pinion gear 106 may include, but are not limited to, a spiral-type, helical-type, worm-type, straight-type, and the like.

The bevel gear 104 includes one or more portions, such as, but not limited to, teeth 118, face portion 120, spacer portions 122, and the like. The bevel gear 104 includes a plurality of the teeth 118. The teeth 118 project from the face portion 120 normal to the face portion 120 and/or project parallel with an axis of rotation of the bevel gear 104. The bevel gear 104 includes a circular cross-section. The teeth 118 are disposed around the outer perimeter of the circular cross-section of the bevel gear 104. The bevel gear 104 is mounted 90-degrees apart (i.e., normal to, perpendicular, or at right-angles) from the pinion gear 106.

In some embodiments, the bevel gear 104 includes the spacer portions 122. The spacer portions 122 project from the face portion 120 normal to the face portion 120. The spacer portions 122 project from the face portion 120 normal to the face portion 120 to space a substrate 308 away from the face portion 120 and/or to provide a surface to couple with the substrate 308. The spacer portions 122 are disposed in a polar array or a polar pattern about the axis of rotation of the bevel gear 104. As depicted, the spacer portions 122 are depicted with a slotted shape, although this is not intended to be limiting. It is further contemplated, that the spacer portions 122 may include other shapes. For example, the spacer portions 122 may include a single annular ring, or the like. Although the bevel gear 104 is described as including the spacer portions 122, this is not intended as a limitation of the present disclosure. It is further contemplated that the substrate 308 may be coupled directly to the face portion 120.

The plating fixture 100 includes the bushing 112. The bushing 112 couples the bevel gear 104 to the hanger 102. The bushing 112 defines the axis of rotation of the bevel gear 104. The bevel gear 104 is configured to rotate with respect to the hanger 102 by the bushing 112 about the axis of rotation of the bevel gear 104. The bushing 112 may include, but is not limited to, a bushing chemically inert in an electroforming bath. The bevel gear 104 is coupled to and configured to rotate relative to the hanger 102 by the bushing 112. In some embodiments, the bevel gear 104 is coupled to and configured to rotate relative to the base portion 128 of the hanger 102 by the bushing 112. For example, the bushing 112 rotatably couples the bevel gear 104 to the base portion 128 of the hanger 102. The bushing 112 keeps the bevel gear 104 centered as the bevel gear 104 rotates.

In some embodiments, the plating fixture 100 includes one or more probes 116. The probes 116 may also be referred to as L-shaped brackets or spring-loaded probes. The probes 116 are coupled to and configured to rotate relative to the bevel gear 104. For example, the probes 116 are rotatably coupled to the face portion 120 of the bevel gear 104. The bevel gear 104 are rotatably coupled to the face portion 120 of the bevel gear 104 adjacent to the spacer portions 122. The probes 116 and the bevel gear 104 form a substrate holder. In some embodiments, the probes 116 and the spacer portions 122 of the bevel gear 104 form the substrate holder. The probes 116 hold a substrate 308 disposed between the probes 116 and the bevel gear 104. The probes 116 are configured rotate above the bevel gear 104 to allow for quickly removing the substrate 308 from between the probes 116 and the bevel gear 104. For example, the probes 116 are configured rotate above spacer portions 122 of the bevel gear 104. The plating fixture 100 is depicted with three of the probes 116, although this is not intended to be limiting. It is contemplated that the plating fixture 100 may include between one and three of the probes 116, or more of the probes 116.

The probes 116 defines one or more holes 132. The holes 132 are configured to receive one or more wires. In some embodiments, the holes 132 are threaded-holes. The holes 132 enable electrically connecting a substrate 308 disposed between the probes 116 and the bevel gear 104 to a rectifier 302. For example, wires 314 may be electrically connected to the substrate 308 via the holes 132.

Figure 2:
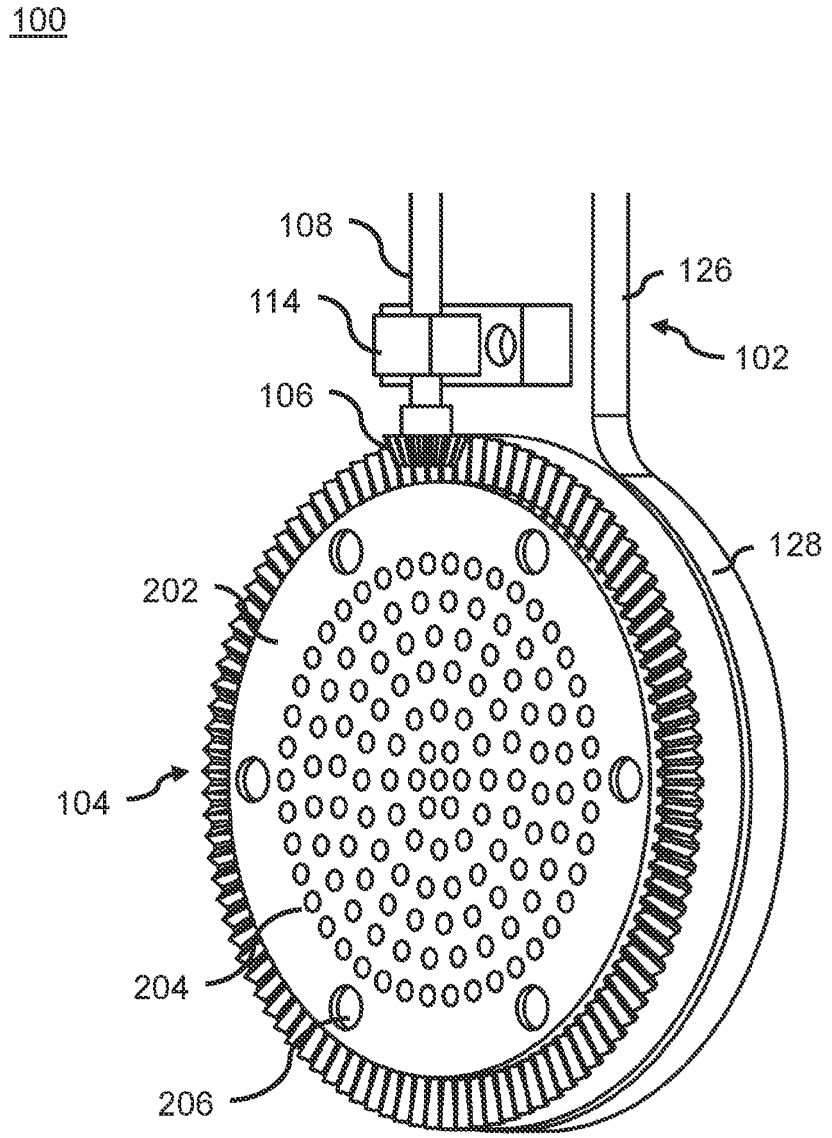
FIG. 2 depicts a perspective view of a substrate holder of a plating fixture including a shield, in accordance with one or more embodiments of the present disclosure.

Referring now to FIG. 2, the plating fixture 100 is described, in accordance with one or more embodiments of the present disclosure. Although the plating fixture 100 has been described as including the probes 116, this is not intended as a limitation of the present disclosure. In some embodiments, the plating fixture 100 includes a shield 202. The shield 202 may function similarly to the probes 116. The shield 202 is coupled to the bevel gear 104. For example, the shield 202 is detachably coupled to the face portion 120 of the bevel gear 104. The bevel gear 104 is detachably coupled to the face portion 120 of the bevel gear 104 adjacent to the spacer portions 122. The bevel gear 104 is detachably coupled by one or more fasteners. The shield 202 and the bevel gear 104 form a substrate holder. In some embodiments, the shield 202 and the spacer portions 122 of the bevel gear 104 form the substrate holder. The shield 202 is disposed between the teeth of the bevel gear 104. The shield 202 and the bevel gear 104 share a common axis of rotation. The shield 202 rotates with rotation of the bevel gear 104.

The shield 202 defines a plurality of holes 204. The plurality of holes 204 are through holes. The holes 204 are defined through a width of the shield 202. The holes 204 allow plating liquid to flow through the shield 202 to a substrate 308 disposed between the shield 202 and the bevel gear 104. The holes 204 are disposed in a polar array or a polar pattern about the axis of rotation of the shield 202 and the bevel gear 104. The holes 204 cause the shield 202 levels out a flow of plating fluid 312 to a substrate 308 between the shield 202 and the bevel gear 104 during a plating process. For example, when the plating fixture 100 is used to plate copper, the copper plates more quickly at the edges of the substrate 308 than in the middle of the substrate 308. The holes 204 even out the plating across the entire surface of the substrate 308.

The shield 202 defines a plurality of holes 206. The holes 206 are configured to receive one or more wires. In some embodiments, the holes 206 are threaded-holes. The holes 206 enable connecting a substrate 308 disposed between the shield 202 and the bevel gear 104 to a rectifier 302. In some embodiments, the shield 202 includes six of the holes 206, although this is not intended to be limiting. The holes 206 enable electrically connecting a substrate 308 disposed between the shield 202 and the bevel gear 104 to a rectifier 302. For example, wires 314 may be electrically connected to the substrate 308 via the holes 206.

Figure 3A:
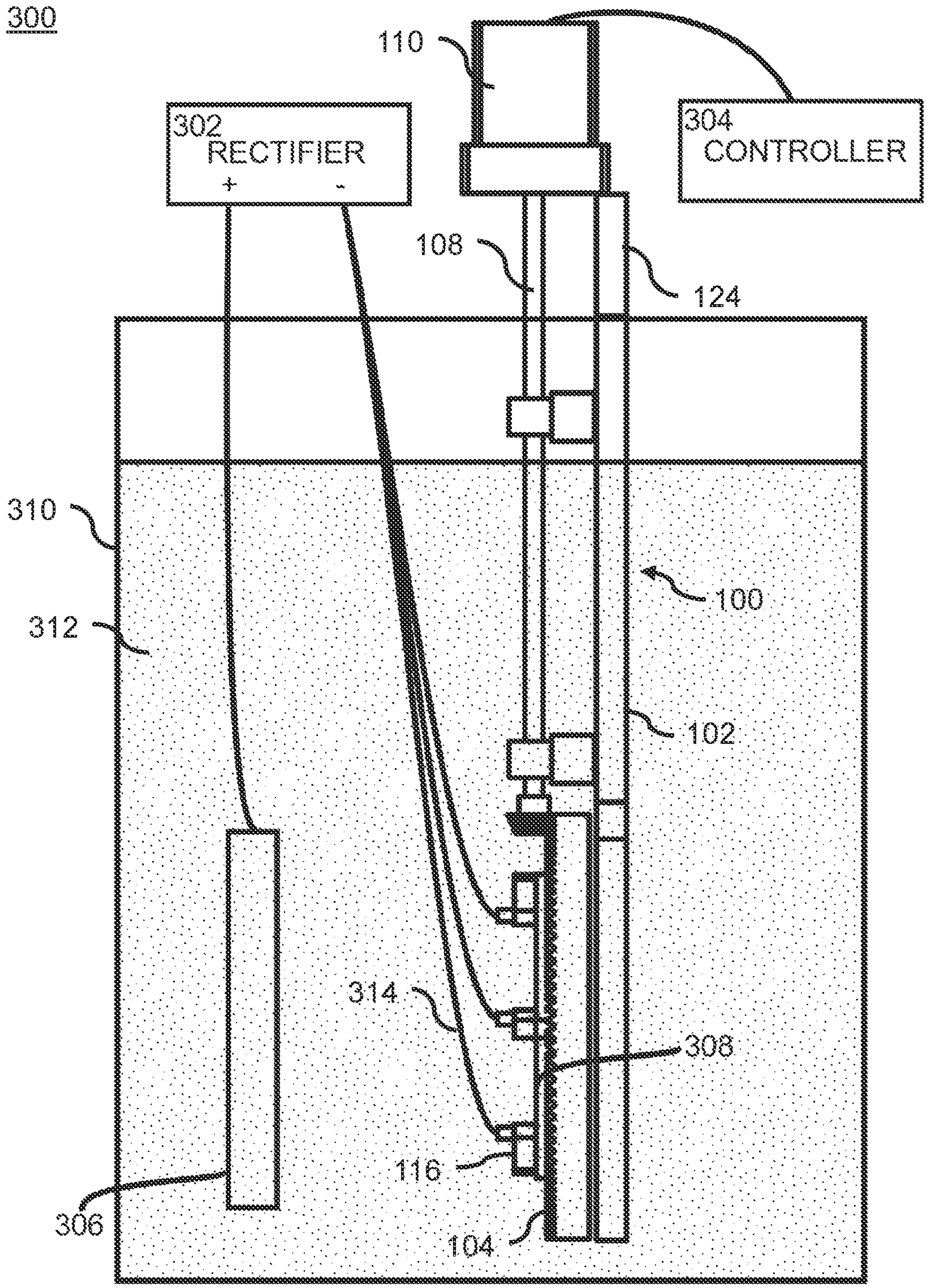
FIG. 3A depicts a plating system including a plating fixture, in accordance with one or more embodiments of the present disclosure.
Figure 3B:
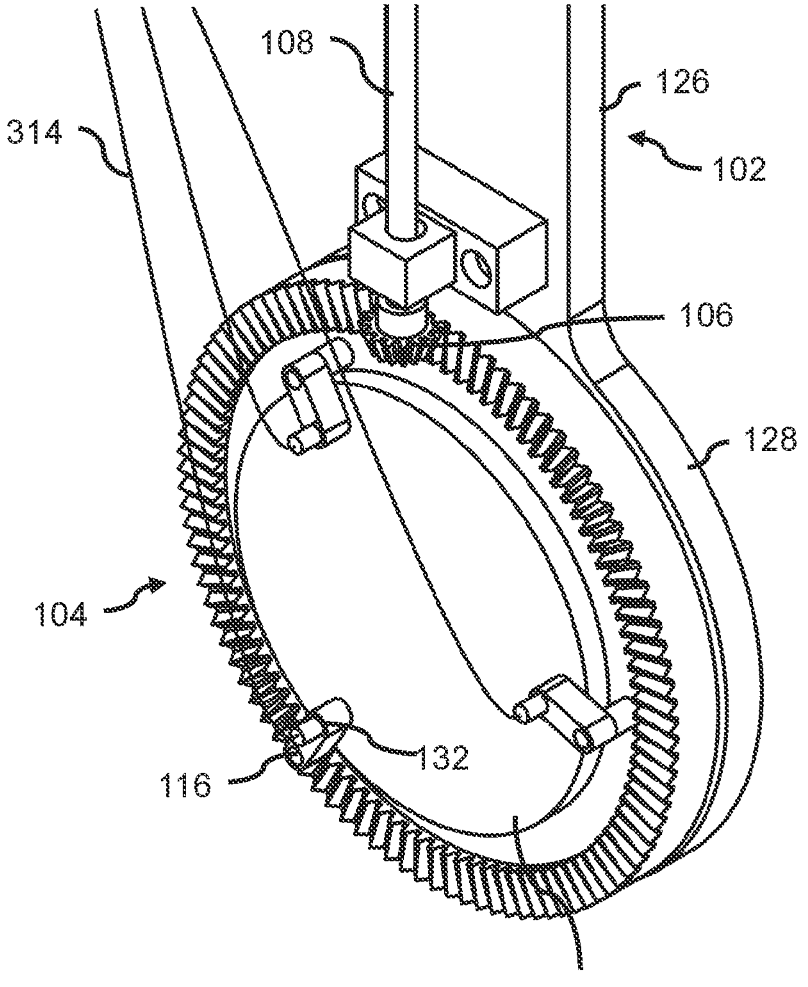
FIG. 3B depicts a plating system including a perspective view of a substrate holder of a plating fixture with wires electrically connected to a substrate, in accordance with one or more embodiments of the present disclosure.

Referring now to FIGS. 3A-3B, a plating system 300 is described, in accordance with one or more embodiments of the present disclosure. It is contemplated that the plating system 300 may refer to an electroforming and/or an electroplating system. The plating system 300 includes one or more components, such as, but not limited to, the plating fixture 100, rectifier 302, controller 304, anode 306, substrate 308, plating bath 310, plating fluid 312, and the like.

The plating system 300 includes the plating bath 310. The plating bath 310 is a vessel holding the plating fluid 312. The plating system 300 includes the plating fluid 312. The plating fluid 312 may also be referred to as a plating solution, an electrolyte solution, or the like. The plating fluid 312 may include an acid solution, an alkaline solution, or the like. The plating fluid 312 serves as a conductive medium, via electrolysis, for electroplating. The plating fluid 312 may include sulfite gold, acid copper, cyanide gold, sulfuric acid, hydrochloric acid, copper sulfate, and the like.

The plating system 300 includes substrate 308. In some embodiments, the substrate 308 is round. The substrate 308 may include, but is not limited to, a wafer (e.g., a semiconductor wafer). In some embodiments, the substrate 308 may include deep cavities. The plating system 300 may be used to plate the deep cavities.

The plating system 300 includes the anode 306. The anode 306 comprises a metal or alloy. For example, the anode 306 may include gold, copper, nickel, zinc, chromium, gold, silver, platinum, tin, lead, iron, steel, aluminum, brass, bronze, and the like. The anode 306 is disposed in the plating bath 310 immersed within the plating fluid 312. The anode 306 is separated from the plating fixture 100 and the substrate 308.

The plating system 300 includes the plating fixture 100. It is contemplated that the plating fixture 100 may accommodate any size of wafers by scaling the plating fixture 100. The substrate holder of the plating fixture 100 is configured to receive the substrate 308. For example, the substrate 308 may be disposed between the probes 116 and the bevel gear 104, which form the substrate holder. By way of another example, the substrate 308 may be disposed between the shield 202 and the bevel gear 104, which form the substrate holder.

The plating fixture 100 may be set on the plating bath 310. For example, the hanger 102 may be set on the plating bath 310. For instance, the horizontal portion 124 of the hanger 102 may be set on the plating bath 310. The plating fixture 100 may then be maintained in the position during a plating process.

One or more portions of the plating fixture 100 are disposed in the plating fluid 312. For example, the hanger 102, bevel gear 104, pinion gear 106, shaft 108, bushing 112, one or more pillow block bearings 114, one or more probes 116, and the like may be disposed in the plating fluid 312. In some embodiments, all but the stepper motor 110 is disposed in the plating fluid 312. The stepper motor 110 is disposed above the plating fluid 312. For example, the fluid level of the plating fluid 312 sits below the stepper motor 110. The shaft 108 extends from the stepper motor 110 into the plating fluid 312.

Any number of components of the plating fixture 100 are compatible with and/or chemically inert in the plating fluid 312. In some embodiments, the hanger 102, bevel gear 104, pinion gear 106, shaft 108, bushing 112, one or more pillow block bearings 114, one or more probes 116, and the like are compatible with and/or chemically inert in the plating fluid 312. For example, the hanger 102, bevel gear 104, pinion gear 106, shaft 108, bushing 112, one or more pillow block bearings 114, and one or more probes 116 may include a Polyether ether ketone (PEEK) material. The PEEK material is chemically inert in the plating fluid 312.

The plating fixture 100 holds the substrate 308 in a vertical orientation. The axis of rotation of the bevel gear 104 and the substrate 308 is in a horizontal orientation. The stepper motor 110 causes the bevel gear 104 and the substrate 308 to rotate about the axis of rotation in the horizontal orientation. The plating fixture 100 allows the geometry of the desired plating to change as the flow within the plating bath 310 is constantly changed at the surface of the substrate 308 by the rotation of the bevel gear 104 and the substrate 308. For example, the rotation of the substrate 308 may break up the turbulent flow of the plating fluid 312 causing uniform plating of the substrate 308. Reducing the turbulent flow may be advantageous to provide uniformity when electroforming gold or copper material in deep cavities of a wafer. The plating fixture 100 is thus configured to be disposed in the plating fluid 312 and provide rotation of the substrate 308.

The plating system 300 includes the rectifier 302. The rectifier 302 is a power supply which supplies a voltage differential across the anode 306 and the substrate 308. For example, the rectifier 302 may be a direct current (DC) power supply. The rectifier 302 includes a negative output and a positive output. The positive output is electrically connected to the anode 306. The negative output is electrically connected to the substrate 308.

A circuit is formed including the anode 306, the plating fluid 312, and the substrate 308 when a voltage is applied across the anode 306 and substrate 308. The circuit causes an oxidation and reduction reaction. The anode 306 dissolves as metal atoms are oxidized and released into the plating fluid 312, maintaining the concentration of metal ions. An electric current is passed through the plating fluid 312 that contains ions of the anode 306 to be deposited on the substrate 308. The metal ions in the plating fluid 312 are attracted to the substrate 308 and reduced to metal atoms, forming a thin layer on the substrate 308. Material from the anode 306 is thus deposited onto the substrate 308 via the plating fluid 312 when a voltage differential is applied across the anode 306 and the substrate 308.

The plating system 300 includes the wires 314. The wires 314 extend perpendicular to the surface of the substrate 308. The wires 314 extend perpendicular to the surface of the substrate 308 to prevent the wires 314 from being caught between the bevel gear 104 and the spur gear 106. The wires 314 electrically connect the substrate 308 to the rectifier 302. For example, the wires 314 electrically connect the substrate 308 to a negative terminal of the rectifier 302. The substrate 308 is then configured as a cathode of the plating system 300. The substrate 308 is connected to the negative terminal (cathode) of the rectifier 302, while the anode 306 is connected to the positive terminal (anode) of the rectifier 302. The wires 314 are coupled to one of the probes 116 or the shield 202. For example, the wires 314 are coupled to the holes 132 of the probes 116. The probes 116 maintains the wires 314 in electrical contact with the substrate 308. By way of another example, the wires 314 are coupled to the holes 206 of the shield 202. The shield 202 maintains the wires 314 in electrical contact with the substrate 308.

The plating system 300 includes the controller 304. The controller 304 may also be referred to as a stepper motor controller. The controller 304 generates control signals for the stepper motor 110. The control signals cause the stepper motor 110 to rotate the shaft 108. The rotation of the shaft 108 then induces rotation of the spur gear 106, the bevel gear 104, and the substrate 308. The rotation of the substrate 308 causes the orientation of the substrate 308 to change during a plating process.

In some embodiments, the controller 304 causes the stepper motor 110 to rotate the bevel gear 104 and the substrate 308 by up to one full revolution, or 360 degrees in one direction. In some embodiments, the controller 304 causes the stepper motor 110 to rotate the bevel gear 104 and the substrate 308 by a partial revolution less than one full revolution. The rotation is selected to prevent the wires 314 from interfering with the mesh between the bevel gear 104 and the spur gear 106.

In some embodiments, the controller 304 is configured to control a speed, number of steps, direction, and the like of the stepper motor 110. The controller 304 controls the speed, number of steps, direction, and the like of the stepper motor 110 by providing control signals to the stepper motor 110. The control signals may include a voltage pulse or the like. The controller 304 may execute one or more program instructions to control the speed, number of steps, and direction of the stepper motor 110.

As described previously herein, the substrate 308 is electrically coupled to the rectifier 302 by the wires 314. The controller 304 cannot continuously cause the stepper motor 110 to rotate the bevel gear 104 and the substrate 308 without pulling off the wires 314. In embodiments, the controller 304 is configured to execute program instructions to prevent pulling out the wires 314. The controller 304 may cause the stepper motor 110 to rotate the bevel gear 104 and the substrate 308 by up to 360-degrees in one direction before returning. The exact number of rotations and speed of rotation is not intended to be limiting. Generally, the controller 304 causes the stepper motor 110 to rotate the bevel gear 104 and the substrate 308 in alternating directions between a clockwise direction and an anticlockwise direction.

In some embodiments, the controller 304 may cause the stepper motor 110 to rotate the bevel gear 104 and the substrate 308 rotate once during a plating cycle (e.g., one clockwise or anticlockwise).

In some embodiments, the controller 304 may cause the stepper motor 110 to rotate the bevel gear 104 and the substrate 308 in a clockwise direction for one revolution followed by rotating in an anticlockwise direction for one revolution. Rotating clockwise for one revolution and then rotate anticlockwise for one revolution causes the wires 314 to be twisted and then untwisted during the rotation. In some embodiments, the controller 304 may cause the stepper motor 110 to rotate the bevel gear 104 and the substrate 308 in a clockwise direction for one revolution followed by rotating in an anticlockwise direction for one revolution once during the plating cycle. In some embodiments, the controller 304 may cause the stepper motor 110 to continuously rotate the bevel gear 104 and the substrate 308 in a clockwise direction for one revolution followed by rotating in an anticlockwise direction for one revolution until the plating cycle is completed.

In some embodiments, the controller 304 may cause the stepper motor 110 to rotate in a clockwise direction for one step followed by rotating in an anticlockwise direction for one step. Thus, the stepper motor 110 may perform a back-and-forth rotation by one step. The back-and-forth rotation by one step may perform quick agitation of the plating fluid 312 near the substrate 308. One step refers to a step-size of the stepper motor 110.

The controller 304 may also control a speed of the stepper motor 110. In some embodiments, the controller 304 may cause the stepper motor 110 to rapidly rotate in a clockwise direction for one revolution followed by slowly rotating in an anticlockwise direction for one revolution. In some embodiments, the controller 304 may cause the stepper motor 110 to slowly rotate in a clockwise direction for one revolution followed by rapidly rotating in an anticlockwise direction for one revolution.

Referring generally again to FIGS. 1A-3B.

In some embodiments, the plating system 300 includes a solution agitator. The solution agitator is configured to agitate the plating fluid 312. In some embodiments, the plating system 300 may include one or more spargers, aerators, or the like.

In some embodiments, the plating system 300 includes an actuator. The actuator is configured to translate the plating fixture 100. The translation of the plating fixture 100 causes agitation in the solution. The agitation may improve the plating. The actuator may translate the plating fixture 100 in any of the x-axis, the y-axis, or the z-axis. For example, the actuator may provide front-to-back, side-to-side, and/or up-to-down movement of the plating fixture 100 relative to the anode 306.

The methods, operations, and/or functionality disclosed may be implemented as sets of instructions or software readable by a device. The steps may include computations which may be performed simultaneously, in parallel, or sequentially. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term “processor” may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as “top,” “bottom,” “over,” “under,” “upper,” “upward,” “lower,” “down,” and “downward” are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively “associated” such that the desired functionality is achieved. Hence, any two components herein combined to achieve a particular functionality can be seen as “associated with” each other such that the desired functionality is achieved, irrespective of architectures or intermedial components. Likewise, any two components so associated can also be viewed as being “connected,” or “coupled,” to each other to achieve the desired functionality, and any two components capable of being so associated can also be viewed as being “couplable,” to each other to achieve the desired functionality. Specific examples of couplable include but are not limited to physically mixable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as “open” terms (e.g., the term “including” should be interpreted as “including but not limited to,” the term “having” should be interpreted as “having at least,” the term “includes” should be interpreted as “includes but is not limited to,” and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases “at least one” and “one or more” to introduce claim recitations. However, the use of such phrases should not be construed to imply that the introduction of a claim recitation by the indefinite articles “a” or “an” limits any particular claim containing such introduced claim recitation to inventions containing only one such recitation, even when the same claim includes the introductory phrases “one or more” or “at least one” and indefinite articles such as “a” or “an” (e.g., “a” and/or “an” should typically be interpreted to mean “at least one” or “one or more”); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A plating fixture comprising:
- a hanger;
- a stepper motor fixed to the hanger;
- a shaft coupled to the stepper motor; wherein the stepper motor is configured to rotate the shaft;
- one or more pillow block bearings fixed to the hanger; wherein the one or more pillow block bearings constrain the shaft to rotate relative to the one or more pillow block bearings;
- a pinion gear coupled to the shaft such that rotation of the shaft by the stepper motor causes rotation of the pinion gear; wherein the stepper motor, the shaft, and the pinion gear share a common axis of rotation;
- a bevel gear coupled to and configured to rotate relative to the hanger; wherein the bevel gear is disposed perpendicular to the pinion gear; wherein the bevel gear meshes with the pinion gear; and
- a plurality of probes coupled to and configured to rotate relative to the bevel gear; wherein the plurality of probes and the bevel gear form a substrate holder.

2. The plating fixture of claim 1, wherein the hanger comprises a horizontal portion; wherein the stepper motor is fixed to the horizontal portion.

3. The plating fixture of claim 2, wherein the hanger comprises the horizontal portion and a stem portion; wherein the stem portion extends from the horizontal portion; wherein the one or more pillow block bearings are fixed to the stem portion.

4. The plating fixture of claim 3, wherein the hanger comprises the horizontal portion, the stem portion, and a base portion; wherein the base portion extends from the stem portion; wherein the bevel gear is coupled to and configured to rotate relative to the base portion by a bushing.

5. The plating fixture of claim 1, wherein the one or more pillow block bearings comprise at least two pillow block bearings.

6. The plating fixture of claim 1, wherein the hanger, the shaft, the pinion gear, and the bevel gear comprise polyether ether ketone (PEEK).

7. The plating fixture of claim 1, the bevel gear comprising a face portion and a plurality of spacer portions; wherein the plurality of spacer portions extend normal to the face portion; wherein the plurality of probes and the plurality of spacer portions of the bevel gear form the substrate holder.

8. A plating system comprising:
- a plating bath holding a plating fluid;
- a substrate;
- an anode;
- a rectifier; wherein the rectifier is electrically coupled to the substrate and the anode;
- a plating fixture comprising:
  - a hanger;
  - a stepper motor fixed to the hanger;
  - a shaft coupled to the stepper motor; wherein the stepper motor is configured to rotate the shaft;
  - one or more pillow block bearings fixed to the hanger; wherein the one or more pillow block bearings constrain the shaft to rotate relative to the one or more pillow block bearings;
  - a pinion gear coupled to the shaft such that rotation of the shaft by the stepper motor causes rotation of the pinion gear; wherein the stepper motor, the shaft, and the pinion gear share a common axis of rotation;
  - a bevel gear coupled to and configured to rotate relative to the hanger; wherein the bevel gear is disposed perpendicular to the pinion gear; wherein the bevel gear meshes with the pinion gear; and
  - a plurality of probes coupled to and configured to rotate relative to the bevel gear; wherein the plurality of probes and the bevel gear form a substrate holder;
- wherein the bevel gear, the anode, and the substrate are disposed within the plating fluid; wherein the stepper motor is disposed above the plating fluid; and
- a controller; wherein the controller causes the stepper motor to rotate the bevel gear and the substrate.

9. The plating system of claim 8, wherein the controller causes the stepper motor to rotate the bevel gear and the substrate in alternating directions between a clockwise direction and an anticlockwise direction.

10. The plating fixture of claim 7, wherein the plurality of probes are configured to rotate relative to the bevel gear between an aligned position in which the plurality of probes are aligned with the plurality of spacer portions and an unaligned position in which the plurality of probes are not aligned with the plurality of spacer portions, wherein the plurality of probes and the plurality of spacer portions of the bevel gear form the substrate holder when the plurality of probes are in the aligned position.

11. The plating fixture of claim 10, wherein arms of the plurality of probes are radially and circumferentially aligned with the plurality of spacer portions in the aligned position, wherein the arms of the plurality of probes are disposed radially outwards of the plurality of spacer portions in the unaligned position.

12. The plating fixture of claim 7, wherein teeth of the bevel gear axially extend from the face portion, wherein the pinion gear meshes with the teeth of the bevel gear, wherein the plurality of probes are disposed radially inwards of the teeth.

13. The plating fixture of claim 1, wherein the plurality of probes are L-shaped brackets comprising stems and arms, wherein the stems axially extend from the bevel gear, wherein the plurality of probes rotate about the stems, wherein the arms are orthogonal to the stems, wherein a substrate is disposed radially inwards of the stems.

14. The plating fixture of claim 1, wherein rotation of the plurality of probes relative to the bevel gear is radially offset from a center axis of the bevel gear.

15. The plating system of claim 8, wherein the plurality of probes define holes receiving wires from the rectifier, wherein the wires are electrically connected to the substrate.

* * * * *